(No Model.)

H. M. LEE.
Car-Brake.

No. 227,368.  Patented May 11, 1880.

WITNESSES,
John T. Whitman
C. E. C. Breck

INVENTOR,
Horace M. Lee
per
Eugene Humphrey
his Attorney

UNITED STATES PATENT OFFICE.

HORACE M. LEE, OF BOSTON, MASSACHUSETTS.

CAR-BRAKE.

SPECIFICATION forming part of Letters Patent No. 227,368, dated May 11, 1880.

Application filed April 6, 1880. (No model.)

*To all whom it may concern:*

Be it known that I, HORACE M. LEE, of Boston, in the county of Suffolk and State of Massachusetts, have invented a new and useful or Improved Car-Brake, which invention is fully set forth in the following specification, reference being had to the accompanying drawings.

My invention relates to improvements in car-brakes; and the invention consists in the construction, combination, and arrangement of certain sliding bars and their actuating mechanism, constituting a car-brake, whereby the motion of car wheels or trucks is retarded by frictional contact with such brake, all as hereinafter described and claimed.

Figure 1:
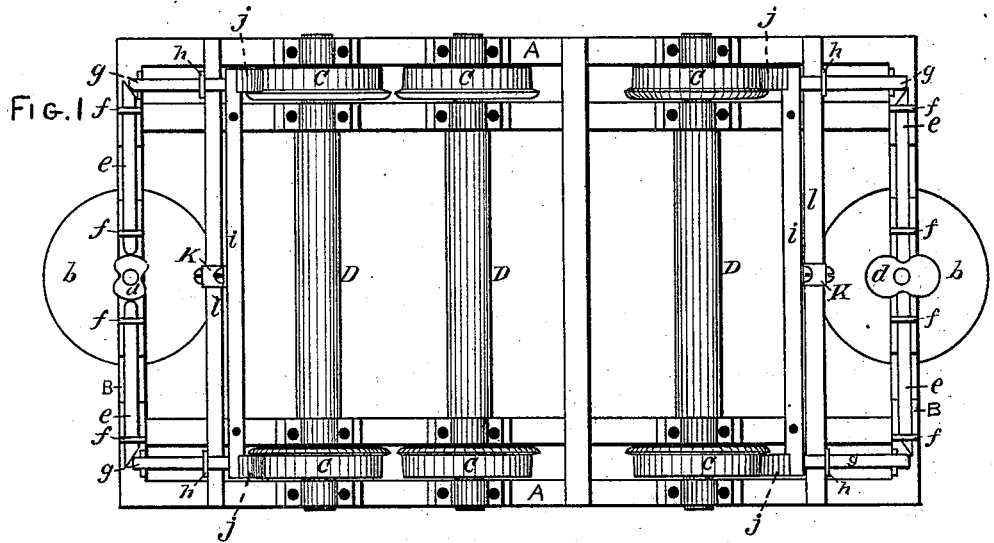
Figure 2:
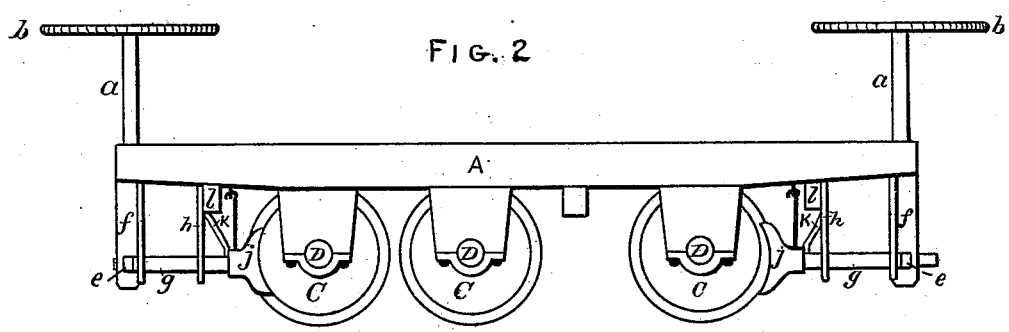
Figure 3:
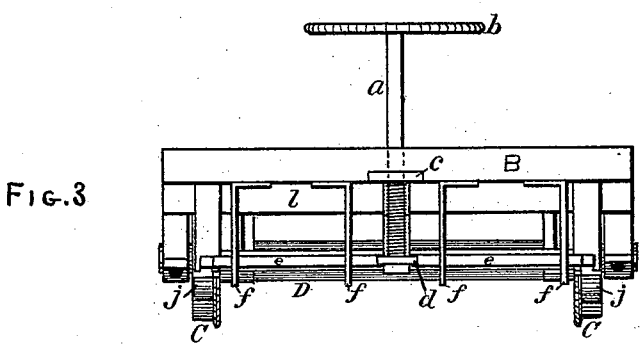

In the accompanying drawings, Figure 1 is an inverted or under-side plan view of a platform-car frame, showing the axles and their trucks thereto attached, and also showing my improved brake as thereto applied. Fig. 2 is a side elevation of the same in position for use. Fig. 3 is an end elevation of the same.

In said views, A A represent the side timbers of the platform-frame, and B B are the transverse or end timbers thereof. In said end timbers are respectively mounted and pivoted the short vertical shafts $a$ $a$, provided with the usual hand-wheels $b$ $b$ for actuating the same, said shafts, at their lower portions, being formed with a screw-thread, as shown in Fig. 3, which engages correspondingly-threaded plates $c$, Fig. 3, secured to said end timbers, B. Upon the lower ends of said shafts $a$ are rigidly secured the cams $d$, Figs. 1, 3. A sliding bar, $e$, is mounted in brackets $f$, secured to timbers B on either side of said cams and in contact therewith, and having their outer ends cut oblique to their axes, as shown in Fig. 1.

$g$ $g$ are bars, also mounted to slide freely in brackets $h$, secured to timbers A, and at their outer extremities are arranged to be in contact with the outer ends of bars $e$ when the same are withdrawn, while at their inner ends they are secured in bars $i$, provided with the brake blocks or shoes $j$, which engage the wheels C, mounted upon axles D, in the usual manner.

A retracting-spring, $k$, is secured to the fixed bar $l$ at one extremity, and at its other end to bar $i$, for the purpose of disengaging shoes $j$ from the trucks when the brake-wheel $b$ is released.

To apply said brake to the wheels C, hand-wheel $b$ is actuated in the usual manner, (and in either direction,) thereby causing the cams $d$ to force bars $e$ outward, and the inclined outer ends of such bars, engaging bars $g$, will force the same toward wheels C, thereby producing the desired contact of shoes $j$ with the periphery of said wheels, as shown at the left in Figs. 1, 2.

For the purpose of disengaging the brakes from the wheels the hand-wheel is actuated to bring cam $d$ into the position shown at the right in Fig. 1, thereby allowing spring $k$, acting upon bar $i$, to slide back bars $g$, which, in turn, force bars $e$ inward to the position shown at the right in said Fig. 1.

The function of the threaded contact of shaft $a$ with plate $c$ is to suspend said shaft in proper relative position, and in case of repair of the brakes, then, by removal of cam $d$ and by properly actuating said shaft, it may be raised to any desired height to facilitate such repairs.

It will be obvious that cams having various configurations of outline may be employed as a transmitting medium in my improved brake; that friction-rollers may be arranged in the ends of the sliding bars, should the application of great force to the wheels be deemed necessary; and that, by securing two or more cams upon a single vertical shaft under a proper arrangement of direct-acting and reacting sliding bars, pressure may be applied at antipodal points of the trucks, thereby securing a complete neutralization of friction upon the journal-bearings; and that, if desired, such system of direct-acting and reacting bars may be so extended as to simultaneously actuate a double or single acting set of brake-shoes upon the trucks at each end of the platform by operating a single hand-wheel, $b$, and upon intermediate trucks, should the same be applied to the rolling-stock upon which my improved brakes are employed.

I claim as my invention—

The combination of the sliding bars $g$ $g$, suitably mounted, connected, and arranged to actuate the friction-shoes $j$, the transverse sliding bars $e$ $e$, constructed and arranged to actuate the bars $g$ $g$, and cam $d$, or an equivalent transmitting device, connected with and actuated by the brake-shaft $a$, substantially as specified.

Witnesses:         HORACE M. LEE.
EUGENE HUMPHREY,
T. W. PORTER.